United States Patent
Fan et al.

(10) Patent No.: US 11,460,976 B2
(45) Date of Patent: Oct. 4, 2022

(54) SYSTEMS AND METHODS FOR ELECTRONIC INFORMATION CARD CREATION FOR CONTEXTUALLY-RELEVANT DATA

(71) Applicant: MicroStrategy Incorporated, Tysons Corner, VA (US)

(72) Inventors: Siyuan Fan, Falls Church, VA (US); Jose Manuel Nocedal De La Garza, Leesburg, VA (US); Nida Imtiaz, Vienna, VA (US)

(73) Assignee: MicroStrategy Incorporated, Tysons Corner, VA (US)

( * ) Notice: Subject to any disclaimer, the term of this patent is extended or adjusted under 35 U.S.C. 154(b) by 0 days.

(21) Appl. No.: 17/316,201

(22) Filed: May 10, 2021

(65) Prior Publication Data

US 2021/0278938 A1 Sep. 9, 2021

Related U.S. Application Data

(63) Continuation of application No. 16/788,530, filed on Feb. 12, 2020, now Pat. No. 11,003,323.

(51) Int. Cl.
| | |
|---|---|
| G06F 3/0482 | (2013.01) |
| G06F 3/04817 | (2022.01) |
| G06F 40/166 | (2020.01) |
| G06F 3/0486 | (2013.01) |
| G06Q 10/10 | (2012.01) |
| G06F 16/23 | (2019.01) |
| G06F 3/04845 | (2022.01) |

(52) U.S. Cl.
CPC ......... *G06F 3/0482* (2013.01); *G06F 3/0486* (2013.01); *G06F 3/04817* (2013.01); *G06F 3/04845* (2013.01); *G06F 16/2379* (2019.01); *G06F 40/166* (2020.01); *G06Q 10/109* (2013.01)

(58) Field of Classification Search
CPC .............. G06F 3/0482; G06F 3/04817; G06F 3/04845; G06F 3/0486; G06F 16/2379; G06F 40/166; G06Q 10/109
See application file for complete search history.

(56) References Cited

U.S. PATENT DOCUMENTS

| | | | |
|---|---|---|---|
| 6,209,005 B1 | 3/2001 | Harker et al. | |
| 7,630,965 B1 | 12/2009 | Erickson et al. | |
| 2004/0172616 A1* | 9/2004 | Rothschiller | ........... G06F 16/86 717/114 |
| 2006/0065707 A1 | 3/2006 | Kanatani et al. | |
| 2006/0293904 A1 | 12/2006 | Ramanathan et al. | |
| 2010/0176194 A1 | 7/2010 | Hodgkinson et al. | |

(Continued)

*Primary Examiner* — Daniel Samwel
(74) *Attorney, Agent, or Firm* — Bookoff McAndrews, PLLC

(57) ABSTRACT

Methods, systems, and apparatus, including computer programs stored on computer-readable media, generate contextually relevant electronic information cards. An indication to generate an electronic information card may be received from a user. In response to the indication, the electronic information card may be generated. A selection of a user interface field element may be received to add to the electronic information card at a location, and, in response to the selection, the user interface element may be added to the electronic information card at the location.

20 Claims, 16 Drawing Sheets

(56) References Cited

U.S. PATENT DOCUMENTS

| | | | |
|---|---|---|---|
| 2012/0212337 A1* | 8/2012 | Montyne | G10L 15/26 704/E15.044 |
| 2012/0233256 A1* | 9/2012 | Shaham | G06Q 30/02 709/204 |
| 2013/0117653 A1* | 5/2013 | Sukhanov | G06F 3/0488 715/243 |
| 2013/0275120 A1* | 10/2013 | DeGross | G06F 40/242 704/9 |
| 2014/0046976 A1* | 2/2014 | Zhang | G06F 16/00 707/772 |
| 2014/0365395 A1* | 12/2014 | Arguelles | G06Q 10/10 705/342 |
| 2018/0020076 A1* | 1/2018 | Porwal | G06F 16/22 |
| 2019/0073350 A1* | 3/2019 | Shiotani | G06F 3/1243 |

* cited by examiner

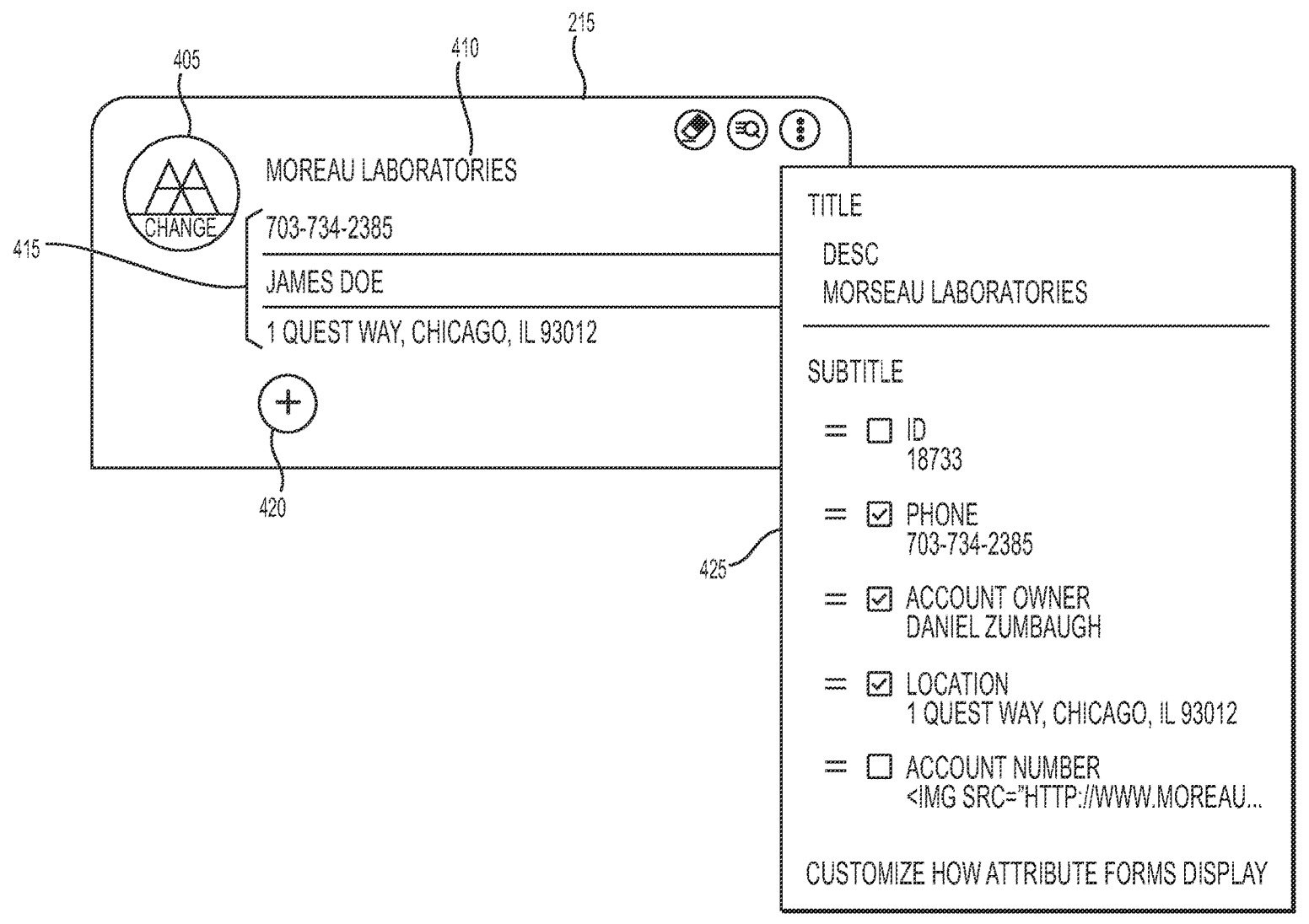

MOREAU LABORATORIES
703-734-2385
JAMES DOE
1 QUEST WAY, CHICAGO, IL 93012

TITLE
DESC MORSEAU LABORATORIES
SUBTITLE
- ☐ ID 18733
- ☑ PHONE 703-734-2385
- ☑ ACCOUNT OWNER DANIEL ZUMBAUGH
- ☑ LOCATION 1 QUEST WAY, CHICAGO, IL 93012
- ☐ ACCOUNT NUMBER <IMG SRC="HTTP://WWW.MOREAU...

CUSTOMIZE HOW ATTRIBUTE FORMS DISPLAY

FIG. 4

TEXT BOX ALWAYS FITS TO CONTENT

TOTAL HEIGHT = 2px + 2px + CONTENT

CONTENT HEIGHT: #LINES * LINE-HEIGHT
LINE-HEIGHT: 130% FONT SIZE.
SAME AS THE FONT SETTING SPEC.

FACTOR 1: FONT SIZE (e.g. 12px VS 14px)

20px=2+2+1.3*12

22px=2+2+1.3*14

FACTOR 2: LINE #

1 LINE

5 LINES

WHILE TYPING FOR LONG LONG LONG LONG LONG LONG LONG LONG STRING, THEN WRAP AND THE CONTAINER HEIGHT WILL GROW AND GROW AND GROW

*FIG. 14*

SYSTEMS AND METHODS FOR ELECTRONIC INFORMATION CARD CREATION FOR CONTEXTUALLY-RELEVANT DATA

CROSS-REFERENCE TO RELATED APPLICATION(S)

This patent application is a continuation of and claims the benefit of priority to U.S. Nonprovisional patent application Ser. No. 16/788,530, filed on Feb. 12, 2020, the entirety of which is incorporated herein by reference.

TECHNICAL FIELD

The present disclosure relates to systems and methods for information card creation for contextually relevant data.

INTRODUCTION

Software applications and websites are capable of accelerating contextually relevant information acquisition as compared with prior paper-based catalogs. However, problems arise in processing copious amounts of data and in presenting contextually relevant information expediently.

The present disclosure is directed to addressing one or more of these challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

In one general aspect, a method for generating contextually relevant electronic information cards comprises receiving an indication from a user to generate an electronic information card, and in response to the indication, generating the electronic information card. A selection from the user of a user interface field element to add to the electronic information card at a location may be received, and in response to the selection, the user interface field element may be added to the electronic information card at the location.

In one general aspect, a system for generating contextually relevant electronic information cards may comprise one or more processors and one or more machine-readable media storing software including instructions that, when executed by the one or more processors, cause the system to perform operations comprising receiving an indication from a user to generate an electronic information card, and in response to the indication, generating the electronic information card. A selection from the user of a user interface field element to add to the electronic information card at a location may be received, and in response to the selection, the user interface field element may be added to the electronic information card at the location.

In one general aspect, a non-transitory machine-readable media may store instructions that, when executed by one or more processors, cause the performance of operations for generating contextually relevant electronic information cards comprising receiving an indication from a user to generate an electronic information card, and in response to the indication, generating the electronic information card. A selection from the user of a user interface field element to add to the electronic information card at a location may be received, and in response to the selection, the user interface field element may be added to the electronic information card at the location.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 4 is an example menu for editing information card displays, according to techniques presented herein.

FIGS. 13-14 show example design features of information cards, according to techniques presented herein.

Like reference numbers and designations in the various drawings indicate like elements.

DETAILED DESCRIPTION

Figure 1:
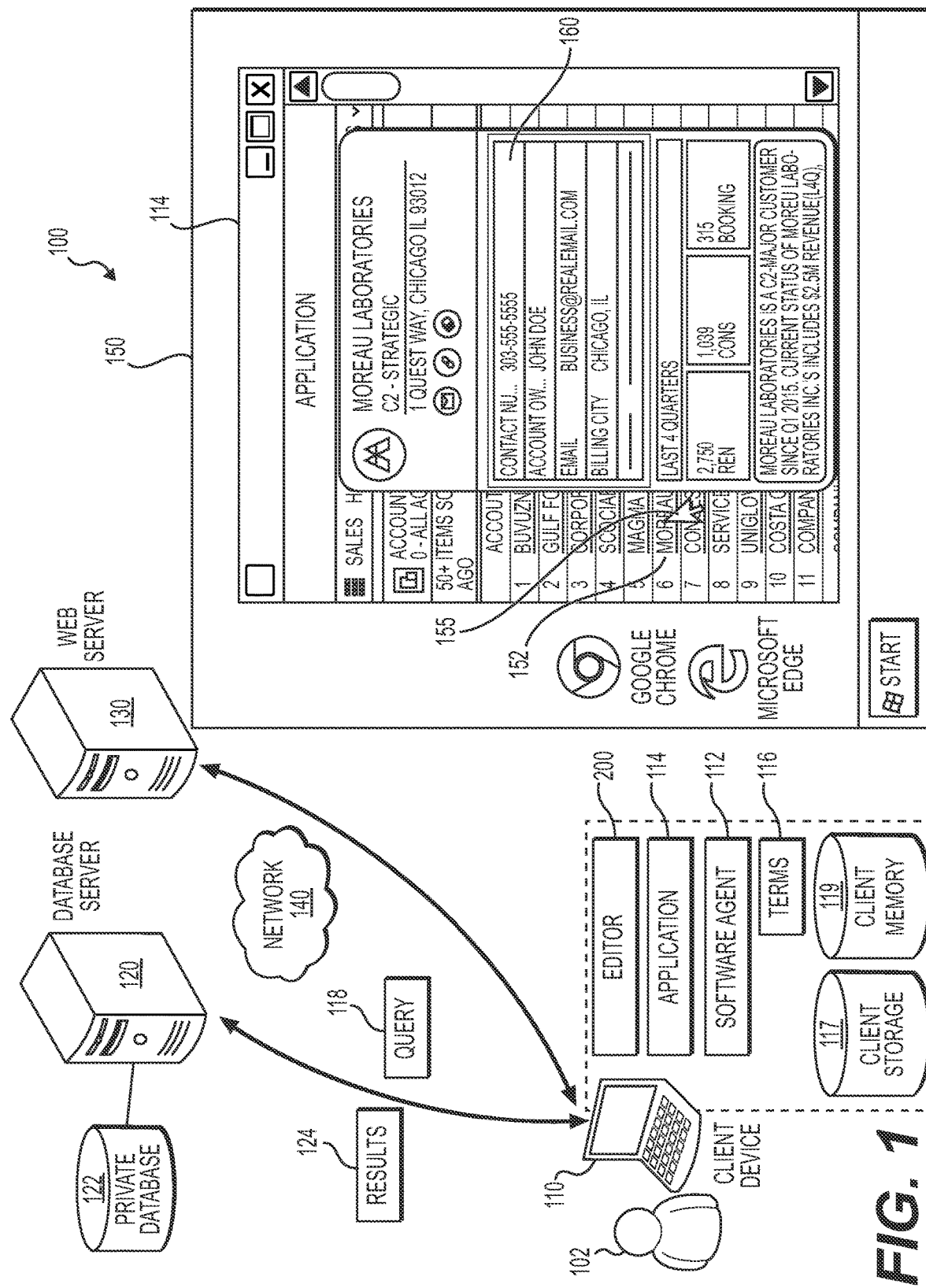
FIG. 1 is a diagram of an example of a system for inline delivery of database content.

In the discussion that follows, relative terms such as "about," "substantially," "approximately," etc. are used to indicate a possible variation of ±10% in a stated numeric value. It should be noted that the description set forth herein is merely illustrative in nature and is not intended to limit the embodiments of the subject matter, or the application and uses of such embodiments. Any implementation described herein as exemplary is not to be construed as preferred or advantageous over other implementations. Rather, as alluded to above, the term "exemplary" is used in the sense of example or "illustrative," rather than "ideal." The terms "comprise," "include," "have," "with," and any variations thereof are used synonymously to denote or describe a non-exclusive inclusion. As such, a process, method, article, or apparatus that uses such terms does not include only those steps, structure or elements but may include other steps, structures or elements not expressly listed or inherent to such process, method, article, or apparatus. Further, the terms "first," "second," and the like, herein do not denote any order, quantity, or importance, but rather are used to distinguish one element from another. Similarly, terms of relative orientation, such as "front side," "top side," "back side," "bottom side," etc. are referenced relative to the described figures. Moreover, the terms "a" and "an" herein do not denote a limitation of quantity, but rather denote the presence of at least one of the referenced item.

In some implementations, a computing system may identify keywords in a user interface, or otherwise on a display, and dynamically retrieve and present relevant information inline, or otherwise in a proximate location, with the user interface. As will be discussed further herein, keywords may be identified upon applying optical character recognition on an image capture of at least a portion of a display. For example, a client device may run a software agent, such as a mobile application, a web browser extension or desktop application, that monitors a display for instances of certain keywords.

When the keywords are present, the software agent may annotate the keywords and make them interactive in the user interface. If a user interacts with a keyword, for example, by placing a cursor over the keyword, the software agent may cause an information card or information panel to be displayed, e.g., overlaying a portion of the original user interface or otherwise inserted into the user interface. Alternatively, information cards associated with keywords, or indicators thereof, may be displayed in a designated area or subportion of a display. Information cards may be displayed in response to a user search, and may be used in conjunction with a calendar, email, or other application, where notifications to the user may be generated if keywords match contents of information cards. In this manner, the user may easily access information that is contextually relevant to the user interface, without the need to open a new application or switch between interfaces. This technique also provides numerous other advantages, such as allowing content to be efficiently integrated with third-party user interfaces that the content provider does not control.

The system may allow for significant customizability. The keywords monitored by the software agent may be specific to a user or the user's organization. For example, when the user is an employee of a company, the keywords of interest may be extracted from a private database for the company. The keywords may additionally or alternatively be selected or filtered to terms applicable to the specific user, e.g., terms relevant to the user's role in the company. When one of the keywords is determined to be present in the user interface, the software agent may communicate with a server system to obtain information related to the keyword. This information may include data retrieved from a private database that has information specific to an organization associated with the user. For example, if the keyword refers to a customer of a user's company, status information, statistics, contact information, and other information about the customer's account with the company can be provided from the company's private database.

The types of information provided, as well as the values shown for those information types, may be customized for the user and organization. For example, a sales representative and a product engineer at the same company may be shown different types of information for the same keyword, due to their different roles. Similarly, two users in a company with the same role might be shown different information for the same keyword, due to the users having different types of previous interactions with the system. In general, the system may use machine learning techniques to predictively select which information to show to a particular user at a particular time for a given keyword, and how to organize the information.

Users may also explicitly search for information cards. A recommendation engine may analyze the user's device activity history and/or search history, and evaluate information cards for similarity to produce a list of recommended information cards in response to a search.

The results may return content-based recommendations. Individual elements of information cards may be compared to determine a similarity score between cards. Multiple dimensions may be used as the input criteria (for example, information card title, subtitle, attributes, metrics, and footer) for a weighting system. Average weight totals may be determined for each card across all active data sets. Cards with a similarity weight value above a predetermined threshold may be returned in response to a search.

The search results may alternatively, or in addition, produce preference-based recommendations. A user's preference may be taken into consideration to determine an "affinity" of each individual card that the user is viewing. User preferences considered may include search history, recently searched cards, cards in the user's calendar events for dates within a predetermined time period. Other considered user preferences may include geolocation, nearby users, favorite information cards, recently shared cards, etc.

The "affinity" of a card along with a "similarity" may be used to determine a combined recommendation score.

In many conventional systems, user interfaces have a predetermined structure or layout designed to accommodate the content displayed. To add a new frame or region of the interface, the structure of each user interface to be updated usually must be changed one by one. For example, to provide embedded content in a web page or web application, the user interface is often designed to include an iFrame or other element for the embedded content. Native applications also generally have pre-defined user interface layouts. This often makes it difficult to add or alter embedded content regions in user interfaces because the source code, HTML code, or other data defining each user interface needs to be individually changed. For example, it may be desirable to provide a new embedded content region in each of many different pages of a web site or web application, but doing so may require changes to each of the pages individually.

Embedding content is also challenging because the party desiring to embed the content may not control or have the ability to change the underlying user interface.

The challenge of embedding content in user interfaces is also significant since the embedded content may be needed only selectively. For example, it may be desirable to embed content on some interfaces but not others. Similarly, the embedded content might only be applicable for a page at certain times and not others. The need for the embedded content may vary over time, and may depend on factors such as the context provided by other content in the page, which may also vary over time. As a result of these factors and others, simply adjusting a general template for many pages cannot perform the fine-grained integration of embedded content, since the decisions whether to embed content and what content to embed is often a page-specific decision that changes over time.

A further challenge arises since embedded content may be assembled from a plurality of data sources, including third party data sources, which may make the process slow and degrade the user experience.

The techniques discussed in this document address these challenges by allowing content to be presented inline or otherwise associated with applications that the content provider does not control and cannot modify. Similarly, the system can be configured to provide content inline or otherwise associated with other content that has not been created yet, such as web pages, web applications, and/or user interfaces of native "heavy" applications that are not yet available.

The techniques in this document also provide an efficient way for users to access information, such as analytics data, in a user interface. By allowing a user to call up an information card within an existing user interface, the user no longer needs to switch applications and lose the context of the applications involved in the user's current task.

Traditionally, if a user is performing a task with an application and desires to look up information from an analytics platform or other database-backed platform, the user generally needs to switch applications or windows, log in, submit a query for the information desired, then wait for results to be returned. The delays, multiple steps required, and overall inconvenience often discourage users from looking up needed information.

By contrast, the techniques in the present application do not require the user to switch applications or interfaces, and contextually-relevant information is provided in the interface, or overlapping/adjacent thereto, where the user needs the information. This provides needed information to just the right user, at the right time, at the user interface where the information is needed. Delays are minimal because the client device can request and receive contents of the information cards before the user indicates that the information should be displayed. The software agent on a client device can evaluate contents of the user interface, generate a query for a server system, and receive and format results for display so the information cards for each of multiple different terms are available for display before the user indicates the terms of interest. Also, the user can call up the information with a single action on the existing interface, such as a mouse-over, hover, click, gaze, gesture, or tap on a term in the user interface. While the term "cursor" may be used herein, this term may also indicate points of user focus on the screen even though no visible cursor is present. For example, a user placing a finger on a touchscreen may indicate a point of user focus that may be called a cursor, even though a visible cursor might not be present.

Limited user interface space might be used since the information card may be provided in the same window or area of the application the user is already using, with no need to switch between applications. Also, the information card may be displayed and removed dynamically, so it is shown only when the user requests it. Unlike interfaces that include a dedicated, persistent area for content that may not be needed at most times, the present technique frees up more of the interface for use by an application.

The techniques discussed below also provide an efficient way to publish customized or private database content to users. The keywords or terms of interest to each organization can be set based on the private database contents for the organization. For example, each organization can have its own set of customers, employees, suppliers, product names, and so on reflected in its private database. Based on the database contents, terms/keywords may have a semantic meaning that is specific to that organization, which the system uses to tailor the display of information for members of the organization.

In some implementations, the system provides an interface for an administrator to easily adjust the sets of terms that the system will highlight and make interactive for members of the organization by updating the database or identifying certain portions of a dataset. For example, an administrator may identify columns of a private database corresponding to employee names, customer names, and product names. The system may extract the contents of these columns and designate them as key terms for the organization. The current set of these terms can be downloaded to client devices of members of the organization when they authenticate to the software agents on the client devices, so each time the user authenticates, the set of terms is refreshed at the client device based on the current state of the database. The terms may be organized into related categories. Each category may be known as an information card set. For example, terms corresponding to company names may be categorized under a company information card set. Terms corresponding to employee names may be categorized under an employee information card set. The information displayed in the information cards may also be generated using the current records of the database. Thus, by designating certain records or fields from an organization's database, an administrator can adjust or update the set of content published to some or all members of the organization, which will be made available through many user interfaces (e.g., presented in-line or adjacent to any web page or desktop application interface).

When a client device indicates that one of the key terms for the organization is present, the server system can access the underlying database record(s) corresponding to the term to generate relevant information to provide. The semantic meaning of the term that is applicable for the user and organization may be used to provide customized results. For example, different types of information may be provided based on the classification of the term, e.g., whether a term is the name of an employee, customer, or product. Different semantic classifications can have different data types or sets of information to be provided. Even for a particular classification, of the many potential types of data that may be provided, a subset may be selected based on analysis of the database contents (e.g., to identify trends or items that are popular, recent, or unusual according to various thresholds), relevance to the user (e.g., applicability to the user's historical behavior or role in the organization), and/or context (e.g., other keywords in the user interface, which may indicate geographical location, time, individuals, or other information relevant to the user's current task). In this process, the organization's security policies are preserved. If a user does not have authorization to access a field or record from the database, the server system may enforce access restrictions and might not provide the information. Consequently, different users, even within the same organization, may be presented different sets of information for the same term, due to the users' differing roles, interaction histories, access authorizations, and other factors. The data to be presented may also be customized based on the application in which the term is detected on an application-by-application basis.

FIG. 1 is a diagram of an example of a system 100 for inline or otherwise proximate delivery of contextually relevant database content. The system 100 may include one or more client devices 110, one or more servers 120, and/or one or more web servers 130. The client device 110, server 120, and web server 130 may communicate with each other across one or more networks 140. The server 120 may have access to one or more private databases 122 for an organization. The server 120 may be implemented using multiple computers that cooperate to perform the functions discussed below, and which may be located remotely from each other.

The client device 110 may include an application 114 as well as a software agent 112 that enables the client device 110 to dynamically generate and display contextually-relevant information cards 160 inline with, or adjacent to, the application 114 on an electronic display 150 of the client device 110. As discussed below, the software agent 112 may allow the client device 110 to obtain and provide information from the private database 122 with the application 114 and web page from the web server 130, even though the application 114, which may access a web page, may be controlled by third parties.

The client device 110 may be associated with a user 102, who may be a member of an organization, e.g., an employee of a company. The private database 122 represents database records stored by or for the organization. The records might not be publicly available and may be subject to data access restrictions, such as requirements that users be issued credentials from the organization that grant authorization to access the records. Different users may be granted different levels of authorization, and the server 120 may enforce access restrictions so that each user is only allowed to access the subsets of information the user is authorized to access. Techniques used herein may also accumulate data from publicly available databases for displaying information cards 160.

In the system 100, instead of incorporating additional content into the source of a document or application, information may be instead added, just in time, through the software agent 112, for example, a browser extension for a web browser, a subroutine of application 114, etc. This provides the flexibility for the system to selectively provide dynamically changing content from the private database 122 for any interface shown on the application 114, e.g., any web application or web page displayed by a web browser, any user interface displayed on the electronic display 150 of the client device 110, etc.

In the example of FIG. 1, the client device 110 may communicate with the web server 130 to obtain and display a page of a web site or other user interface of the application 114. Web server 130 may make available an Application Programming Interface (API) through which information may be provided. Alternatively, application 114 may comprise a native desktop application, and may require no communication or minimal communication with web server 130. The client device 110 generates an electronic display 150 for the application 114. The client device 110 may generate displays in the electronic display 150 for more than one application. Concurrently, the software agent 112 runs on the client device 110 and may receive, from the application 114, the text content of the rendered page, e.g., electronic display 150. The text content may be obtained by performing optical character recognition (OCR) of the electronic display 150, or a portion thereof, such as within a predetermined distance of cursor 155. The electronic display 150 may comprise a desktop displaying one or more applications, including application 114.

The software agent 112 may require the user 102 to authenticate and thus prove authorization to receive content from the private database 122. The authentication of the user 102 can also indicate to the software agent 112 and/or server 120 the role of the user in the organization (e.g., software engineer, marketing technician, financial analyst, and so on) and the specific level of access authorization that has been, or will be, granted to the user 102 by the organization.

With the user logged in, the software agent 112 may access a set of terms 116, e.g., key words and/or phrases, that are relevant to the user 102 and the organization. The set of terms 116 may be stored at the client device 110. Terms 116 may be stored in client storage 117, which may comprise non-volatile storage, and/or client memory 119, which may comprise volatile storage, where the client memory 119 may provide faster data access speeds than the client storage 117. In some implementations, the set of terms 116 is requested and received from the server 120 each time the user 102 authenticates. The set of terms 116 can represent values from certain fields of the private database 122, for example, values representing names of customers of the company of the user 102.

The software agent 112 may compare the terms 116 with at least a portion of the text of the electronic display 150 and/or application 114 to identify matching terms. When the software agent 112 identifies one or more matches, it may generate a query 118 that indicates the matches and send the query 118 to the server 120. In some implementations, the software agent 112 may also examine the text of the electronic display 150 to identify and include in the query 118 other contextual factors that may be of interest (which may be different from the terms 116 of interest), such as terms indicating a time or a geographical location indicated in the electronic display 150, or a task of the user 102 that may be indicated in the electronic display 150. Various words and phrases indicating an overall subject or topic of the electronic display 150 may also be extracted and provided in the query 118.

The server 120 may process the query 118 and generate results 124 using the contents of the private database 122. These results 124 may indicate, for each identified matching term, various indicators (e.g., attributes, statistics, visualizations, text, or other content) relevant to the term. In some instances, the indicators may represent key performance indicators for an entity referred to by an identified term with respect to the specific organization of the user 102. For example, when the term refers to a customer of a company of the user 102, one of the indicators may specify a product of the company that was purchased by the customer, current or forecasted sales of the company to the customer, etc.

The client device 110 may receive the results 124 from the server 120, from client storage 117, and/or client memory 119. The software agent 112 may annotate instances of the identified matching terms in the user interface and prepare the results 124 for display. For example, to annotate the matching terms, the software agent 112 may instruct the application 114 to highlight the term or otherwise change the formatting of the term (e.g., color, font, size, bold, italics, underlining, etc.) in the electronic display 150. In some implementations, the results 124 are not immediately displayed. Rather, the software agent 112 may cause the matching terms to become interactive, so that interaction of the user with a term triggers display of an information card 160 for that term. In this manner, when a user indicates interest in one of the terms, e.g., by placing a mouse cursor 155 over the term, the software agent 112 may be notified of the interaction and cause an information card with the indicators relevant to the term to be displayed. The information card 160 may be displayed overlaying, or adjacent to, a portion of the original user interface, for example, as a pop-up card near the instance of the term that the user interacted with. The software agent 112 may also detect when the user 102 is no longer interested in the information card and automatically remove (e.g., close or hide) the information card in response. For example, when the user moves the cursor 155 away from the interactive term and away from the information card (or taps or clicks outside the interactive term and information card), the software agent 112 may hide or remove the information card.

In FIG. 1, the software agent 112 has determined that the electronic display 150 includes a term 152 "Moreau Laboratories," which is one of the terms 116 relevant to the organization of the user 102. The software agent 112 has received results 124 that indicate indicators for this term 152, which may represent a customer of the organization of the user 102. In response to identifying the matching term 152, and in some instances also receiving results 124 from the server 120 for the matching term 152, the software agent 112 may make the term 152 interactive and causes the term 152 to be annotated. The annotation may comprise, as in this case, underlining, or may be bolding, italicizing, etc. Initially, the software agent 112 might not cause any of the indicators for the term 152 to be displayed. However, when the user moves the cursor 155 over, or otherwise selects, the term 152, the software agent 112 may detect the interaction and display an information card 160 showing various indicators provided by the server 120 in the results 124. When the user 102 is done reviewing the information card 160, the user 102 may move the cursor 155 away or click away from the term 152 and information card 160, and the software agent 112 may automatically hide or remove the information card 160 until the user 102 again interacts with the term 152.

The software agent 112 may receive and examine the content of the electronic display 150 on a recurring or ongoing basis. For example, as the user 102 navigates to a new web page or a new view of an application, the software agent 112 may examine the updated content of the electronic display 150. The software agent 112 may determine matches in the updated interface, request/obtain new results for the updated interface, and may cause new sets of terms to be annotated and made interactive, allowing the user 102 to access information cards for key terms for whatever interface content may be provided in the application 114. The software agent 112 may receive and analyze user interface content in substantially real time. For example, if the user 102 composes an e-mail message, the software agent may detect matching terms in text that the user types, in some instances while the user is still typing, and annotate matching terms in this content.

The system may provide very low latency for users to receive information regarding key terms in a user interface. Because the software agent 112 may identify terms and obtain terms automatically and in the background, in many instances the information needed for an information card 160 may be already present at the client device 110 before the term is annotated. Consequently, when the user interacts with an annotated term, the corresponding information card 160 can be displayed very quickly, often within a second or less. This provides users a very fast response while also allowing access to the information from the private database 122 without having to leave the user interface of the application 114.

Figure 2:
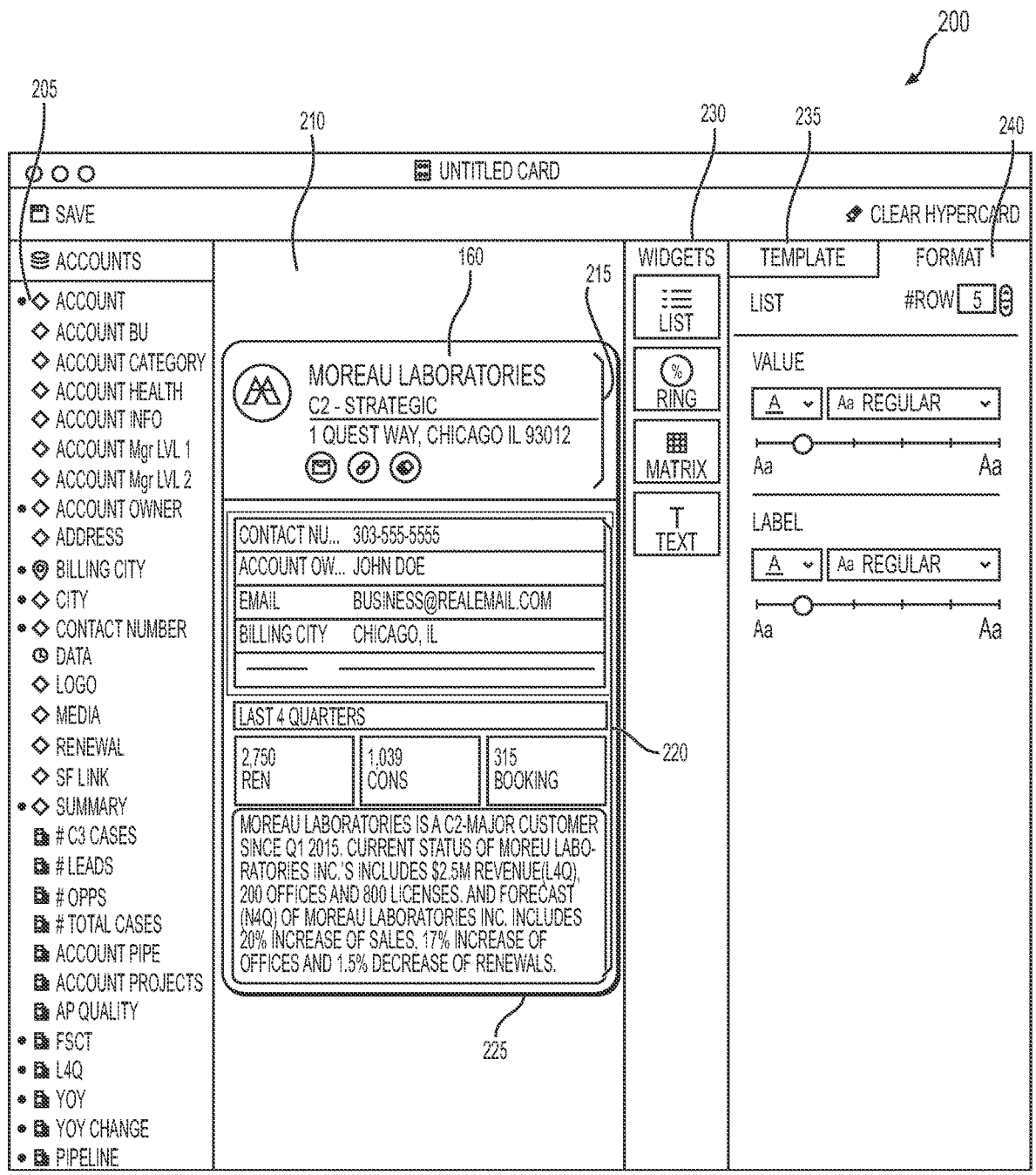
FIGS. 2-3 depict an example editor for designing information cards, according to techniques discussed herein.

Techniques are further disclosed herein for the efficient and flexible design of information cards. FIG. 2 depicts an example editor 200 for designing information cards. The editor 200 may be executed from a client device 110, or some other user device, and may be administered in communication with the database server 120, and/or the web server 130, etc. The editor 200 may be accessible from, or a portion of, application 114, or may be a different application entirely. Different organizations and users 102 may have different needs and use cases for information card utilization. While flexibility is desirable, creating a fully customizable design system, which may include the ability to modify source code, may be both time consuming and unintuitive, and hence expensive. Accordingly, an example editor 200 may be provided that allows for a high degree of customizability in a what you see is what you get (WYSIWYG) editor, while the default number of options provided to the user/designer may be constrained to allow for a faster and more intuitive design platform.

Users may be able to drag and drop data sources using the dataset panel 205, which may allow for the rapid addition of data-rich sources to the information card 160. The information card 160 being designed may be displayed in a design area 210. The information card 160 may have a predetermined number of sections, where each section may have predetermined data types that are permitted for display. For example, header section 215 may allow for an icon, a predetermined numerical range of lines of metadata, and/or a predetermined numerical range of links. The information card body 220 may have a different set of data types that are permitted for display, such as a certain number of widget types. The information card body 220 may similarly permit a number of lines or overall body size within a predetermined range. The footer section 225 of the information card 160 may or may not be present, which may be determined according to predetermined rules, and may be of a prescribed size range.

The user may be able to drag and drop widgets from a widget panel 230, which may be of a predetermined type and number, and may be only draggable to predetermined sections, for example the information card body 220. The user may be able to select templates from a template panel 235, which may determine the overall color scheme and/or design of the information card 160. The user may also be able to control the appearance of widgets or other information card elements using the format panel 240. The contents of the format panel may be set based upon which information card element is currently selected. For example, if a list widget on the information card is selected, formatting options may be displayed in the format panel 240.

Figure 3:
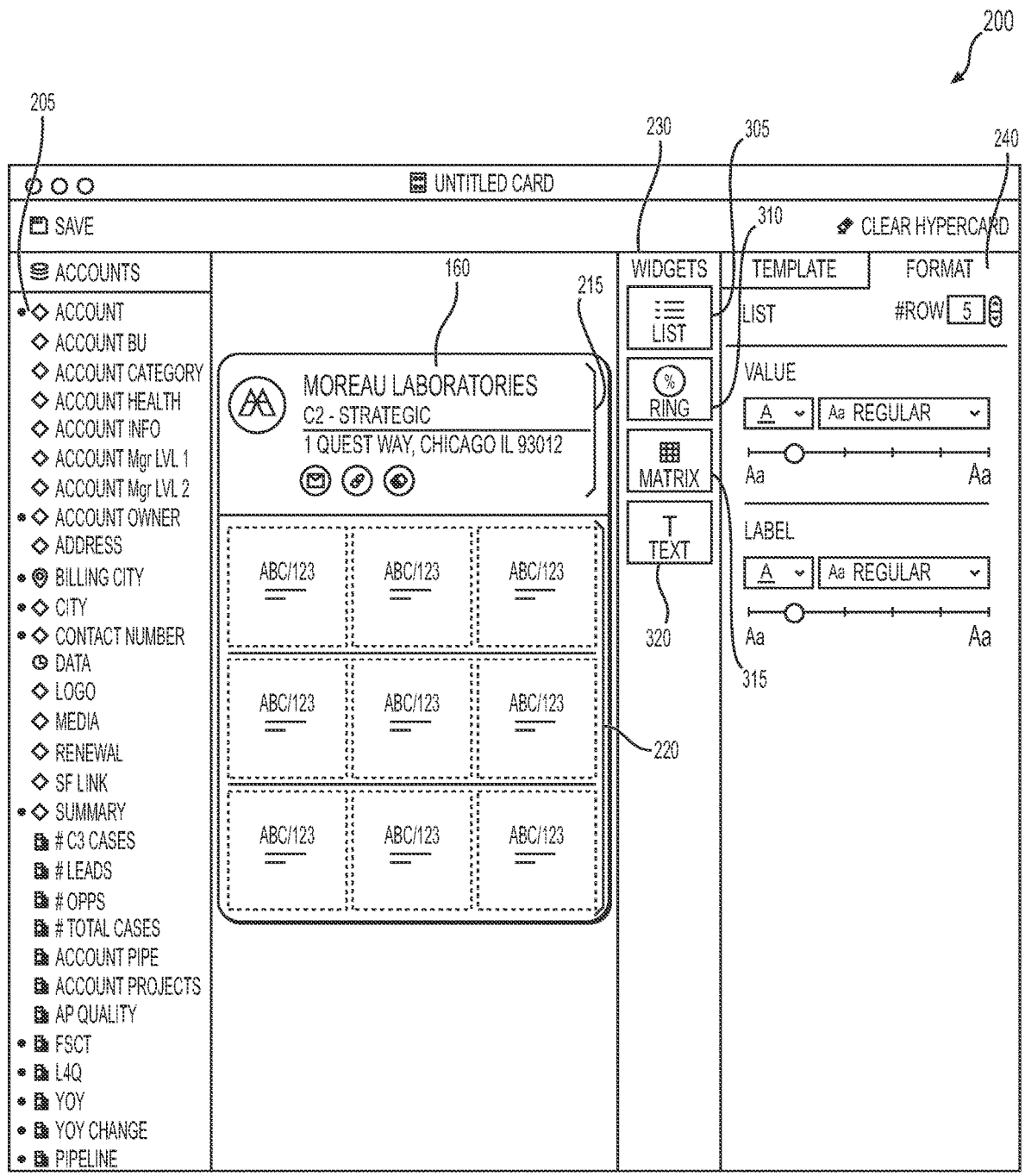

FIG. 3 depicts another view of the example editor 200 for designing information cards, according to techniques discussed herein. The body section 220 of information card 160 is depicted as blank. The user may drag and drop widgets 230 onto the body section 220, and may further drag widgets to reorder them while on the body section 220. The user may also be able to drag and drop widgets outside of the information card 160, which may result in the widget being deleted from the information card 160. Widget types supported may include lists 305, rings 310, matrices 315, and/or text boxes 320. Further, widget types may include a cell. Once added, whenever selected a given widget may be modified using the format panel 240.

When a user drags a widget towards the information card 160, a placeholder may appear in the body 220. The placeholder may be of a predetermined size corresponding to a default size of the widget type. The placeholder may further take a predetermined appearance and color. For example, if the user drags a list widget to the top of the body 220, a gray box placeholder may appear of a predetermined size at the top of the body 220, even before the user places the widget. If the user drags the list widget from there to bottom of the body 220, other widgets may automatically be moved as the user drags downward to make way for the gray box placeholder. In this way, the user may view a preview of the layout if the user were to place the widget at that location.

Even after the user places the widget in the body 220, the user may decide to move the widget, and may drag it to another location. In such a case, while the user is dragging, a placeholder box may again appear and provide a preview of the information card layout should the user drop the widget at that location.

Certain portions of the information card 160 may be restricted for widget display. For example, a widget may not be placeable in the header 215. If the user attempts to place a widget or other restricted data element into the header or other restricted area, an error message may displayed, an icon or visual indicator showing the user placement is not possible may be displayed, etc.

FIG. 4 is an example header in the design view of the editor 200. A predetermined portion of the information card 160 may be designated as the header 215. The header portion may disallow widget placement, as discussed above. Certain other data types may be optionally presented and/or editable within the header 215, such as an icon or logo 405, a title 410, one or more subtitles 415, and one or more links 420. The icon or logo 405 may be changed by the user, and may be changed, for example, by the user clicking on the icon 405 while in editor mode. The title 410 and subtitles 415 may similarly be editable by the user. The fields displayed in the header may be toggled on and off by user selection of items in the menu 425. Features of the header may be editable in the format panel 240.

The subtitles 415 may have a limited number of rows, or may automatically switch to a scrollable box when the number of rows goes beyond a predetermined number.

Links may be added by clicking on the addition sign 420. Links may be static or dynamic, and may comprise hyperlinks or links to applications internal or external to the organization. A user may be limited to a predetermined number of links. The addition sign 420 might not be visible in production mode to the end user.

A predetermined number of header styles may be possible, for example, as templates in the template menu 235. Footer templates might also be selected. Selected templates for the header may automatically determine which footer template is selected. For example, the footer template may be required to match the color, font, etc., of the header template. In the format panel 240, any number of header attributes may be modified, including font size, color, number of possible links or subtitles, etc.

Figure 5:
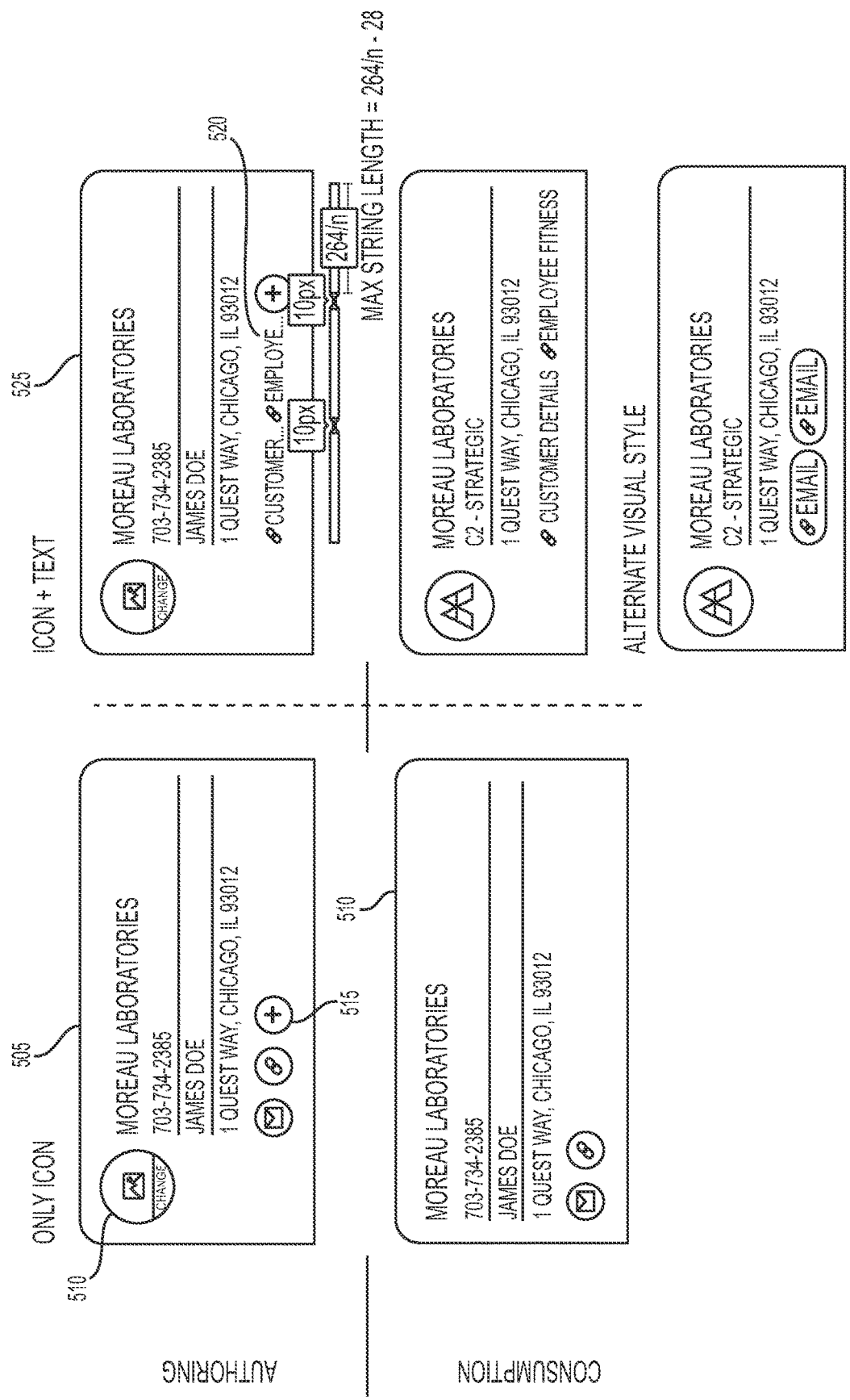
FIG. 5 shows example header designs for information cards, according to techniques presented herein.

FIG. 5 shows example header designs for information cards, according to techniques presented herein. In authoring mode, where the information card is being designed, information card header 505 may display an area where an image 510 may be selected. If the user does not select an image 510, this field may disappear in the consumption/production design, where the information card is shown to the end user, as shown in header 510. Similarly, in authoring mode, link addition icon 515 may be displayed alongside other selected links. However, in production mode, the link addition icon 515 might not be displayed. Thus, possible fields may be displayed during design of the information cards that, if not selected, are not displayed during production mode when the information cards are displayed to the end user.

Links may be displayed as pure icons, or with associated words, as shown for links 520 of information card 525. The length of the descriptor words may be limited to a predetermined number of characters.

Figure 6:
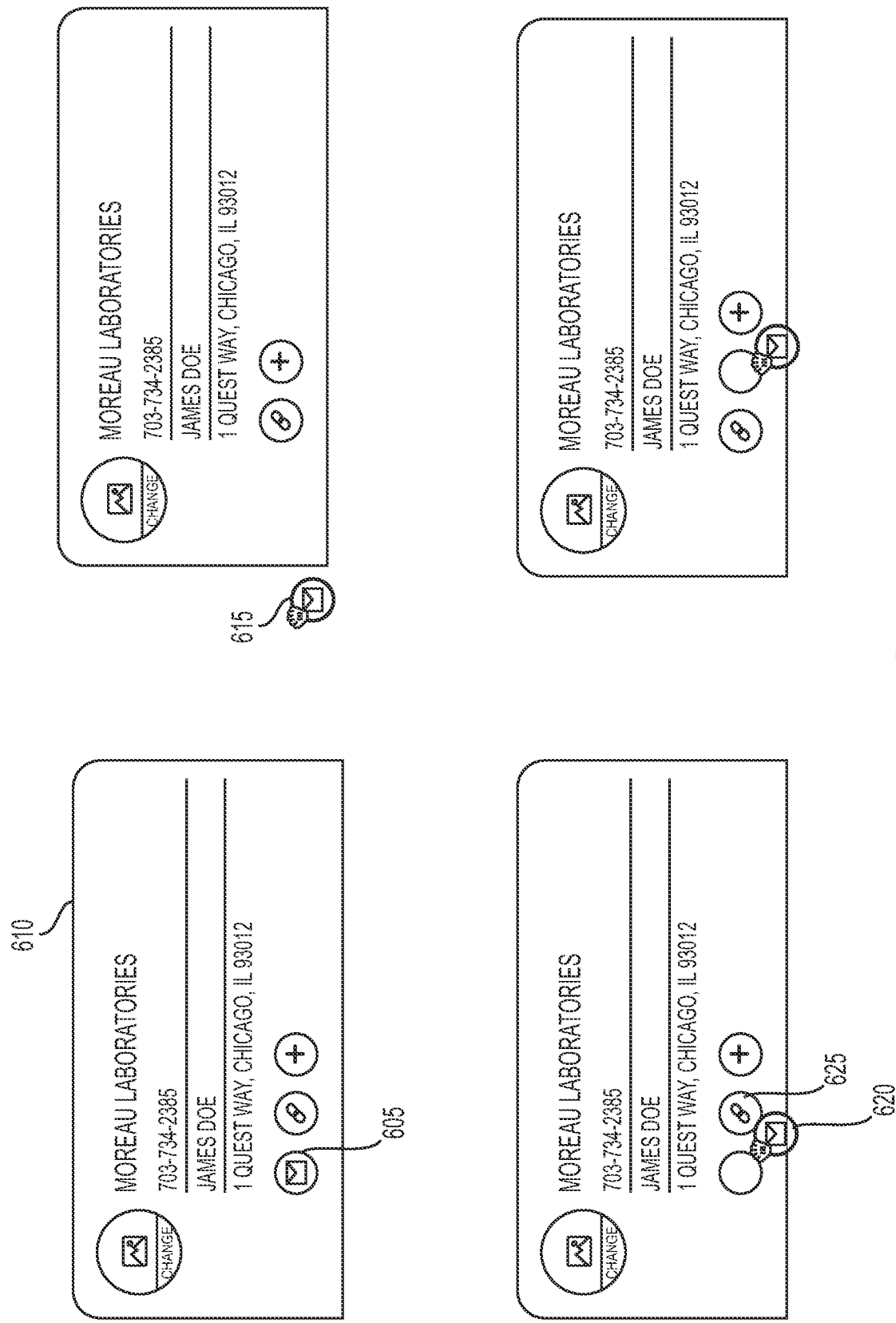
FIG. 6 shows example header design functionalities, according to techniques presented herein.

FIG. 6 shows example header design functionalities, according to techniques presented herein. While in design mode in the editor 200, links may be dragged and dropped off of the information card for deletion. For example, the email link 605 in information card 610 may be dragged off of the information card for deletion, as shown at 615. Further, links may be reordered by dragging and dropping link icons while in the editor 200. For example, the email link 620 may be dragged to the right of link 625 in order to reorder the links.

The number of links that may be displayed on each information card may be a predetermined number, or it may be dynamically determined based upon the size of the information card and/or information card header. The icons of the links may be selected by the user, and might be restricted to only a predetermined set of icons. The colors of the icons, for example email link 605, may be selected by a user, or may be automatically determined based upon the background color of the header. For example, the background color of the header of information card 610 may be determined. The background color of icon 605 may be automatically determined, for example, as slightly darker or slightly lighter than the background floor, or as some other predetermined difference. The icon color may be selected according to predetermined contrast ratio from the background color.

Figure 7:
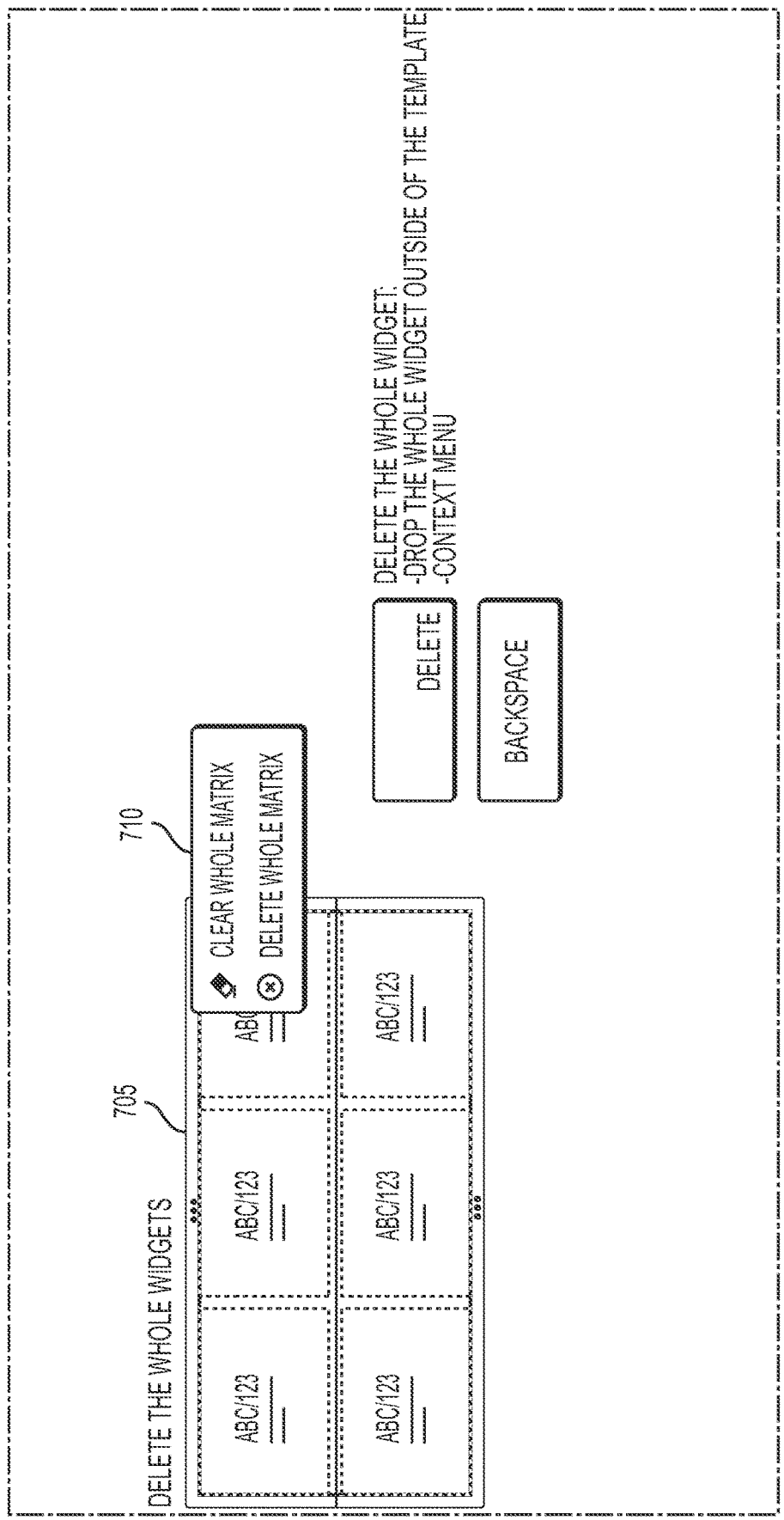
FIGS. 7-10 show example matrix design functionalities for information cards, according to techniques presented herein.

As discussed above, a matrix widget may be added from the widget panel 230 in the editor 200. FIG. 7 shows an example matrix design functionality for information cards, according to techniques presented herein. A matrix 705, which may also be known as a grid, table, or spreadsheet, may display an array of data values that may be related. The user may be further able to delete a widget, such as the matrix widget 705, by dragging and dropping it out of the information card, or by selecting it and hitting backspace, delete keys, etc. The user may be able to perform various operations via the menu 710, such as clearing the matrix or deleting it. The menu 710 might only be accessible by a user clicking within the border of the matrix 705.

Figure 8:
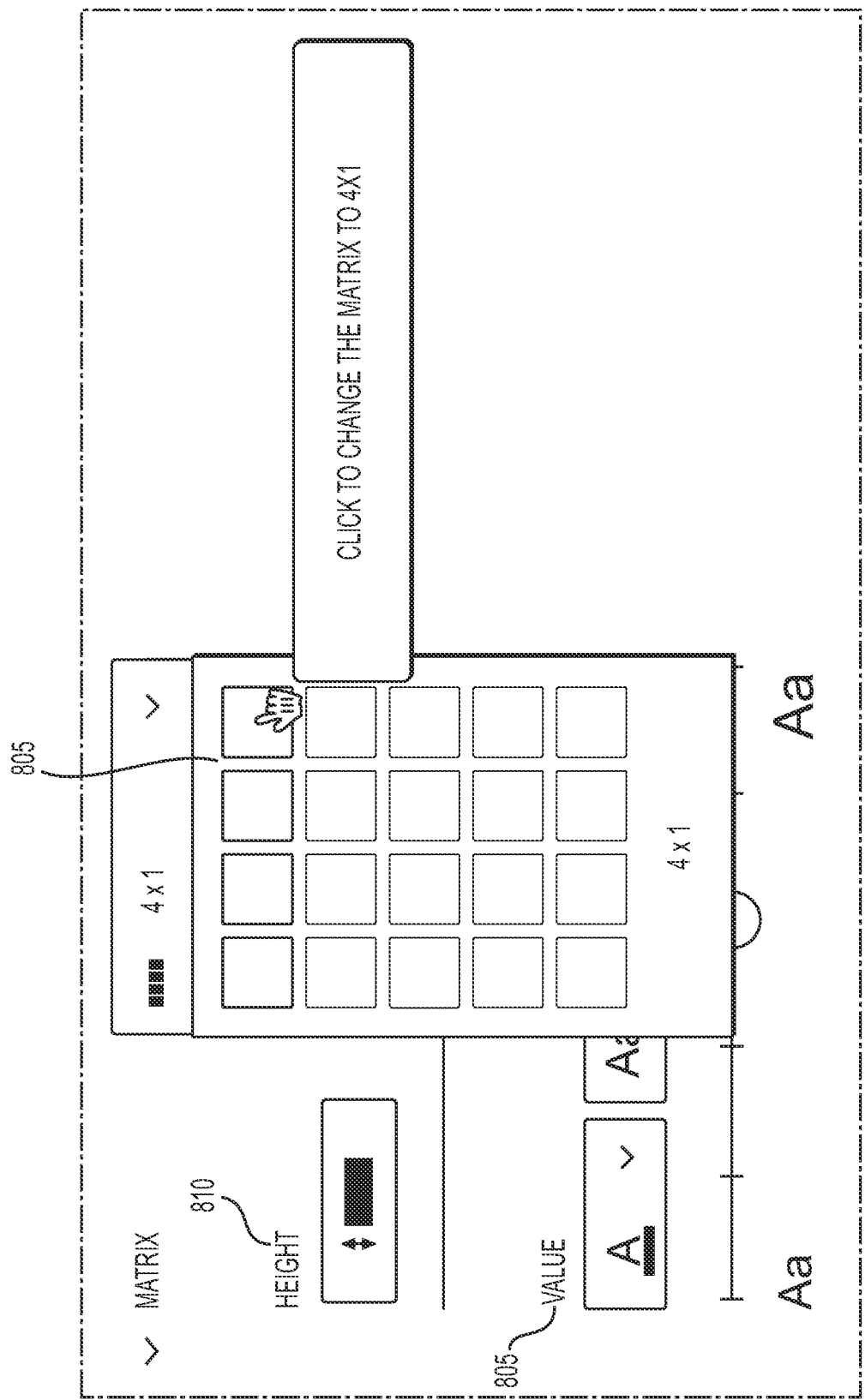

FIG. 8 shows an example matrix design functionality, according to techniques presented herein. The matrix may display data that may be added from the dataset panel 205. The matrix may be modified by changing default field values in the format panel 240, or via other means. For example, the user may be able to set the height and/or font in the format panel 240. Alternatively, the user may be able to drag cell boundaries to increase the height of the widget, or of cells therein. The size of the matrix (e.g., a number of columns and a number of rows) may be modified by clicking on menu 805. The height of a matrix may be modified at field 810. Matrix values, font sizes, and font styles may further be modified in the value fields 815. The matrix may have a predetermined maximum size, which may be determined automatically based on the information card size.

Figure 9:
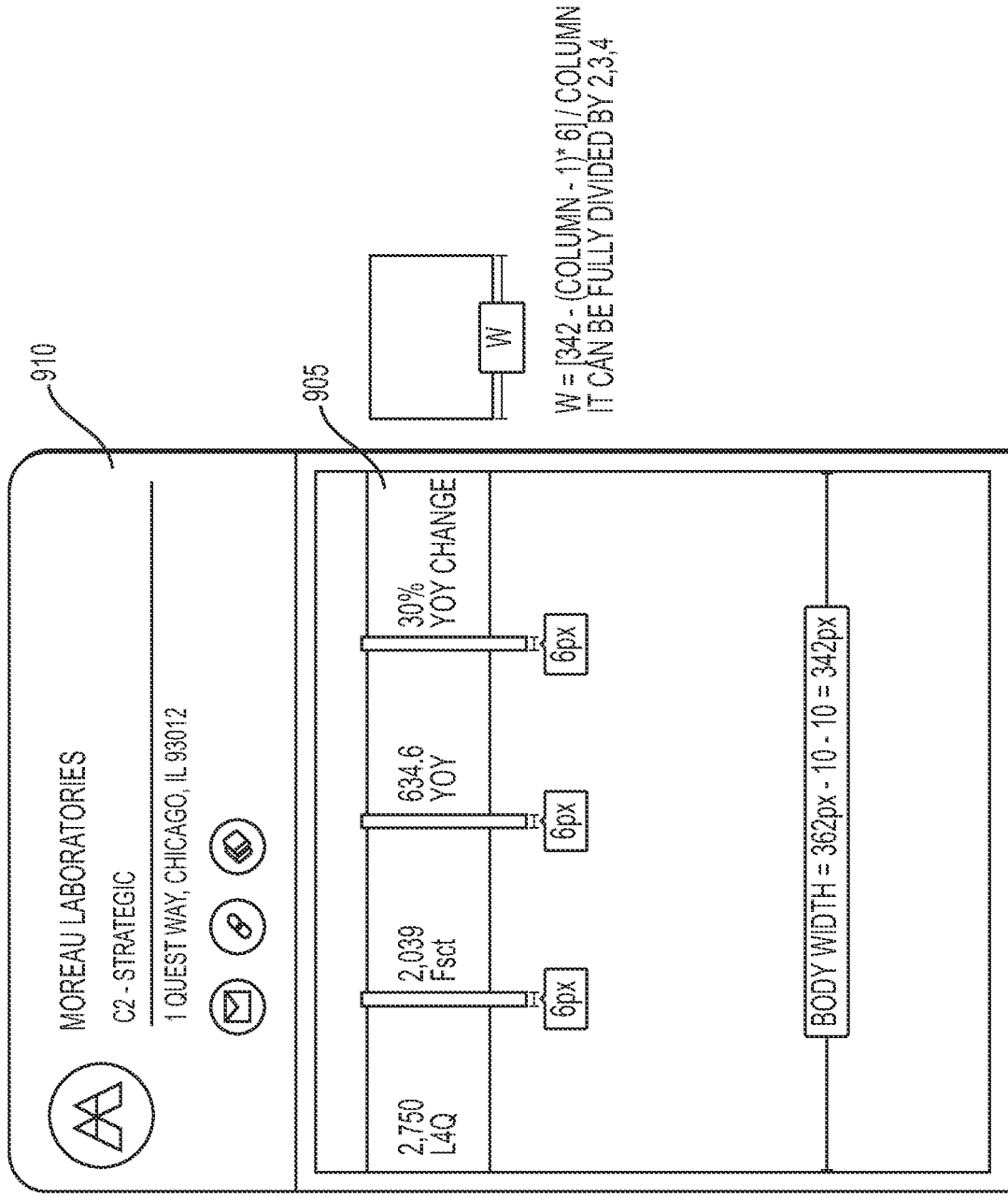

FIG. 9 shows example techniques for modifying the information card design, according to techniques presented herein. Users may be able to manually click and drag the borders of cells 905 in a matrix or other widget in the information card 910 in the editor 200. This may cause the cells to resize. Users may similarly be able to adjust the ratio of space accorded to labels and their corresponding values. While the cells 905 may be depicted as a certain width, it should be understood that within the source code a cell may be subdivided as two or more cells, each having some portion of the width of the cell that appears on the user interface.

Figure 10:
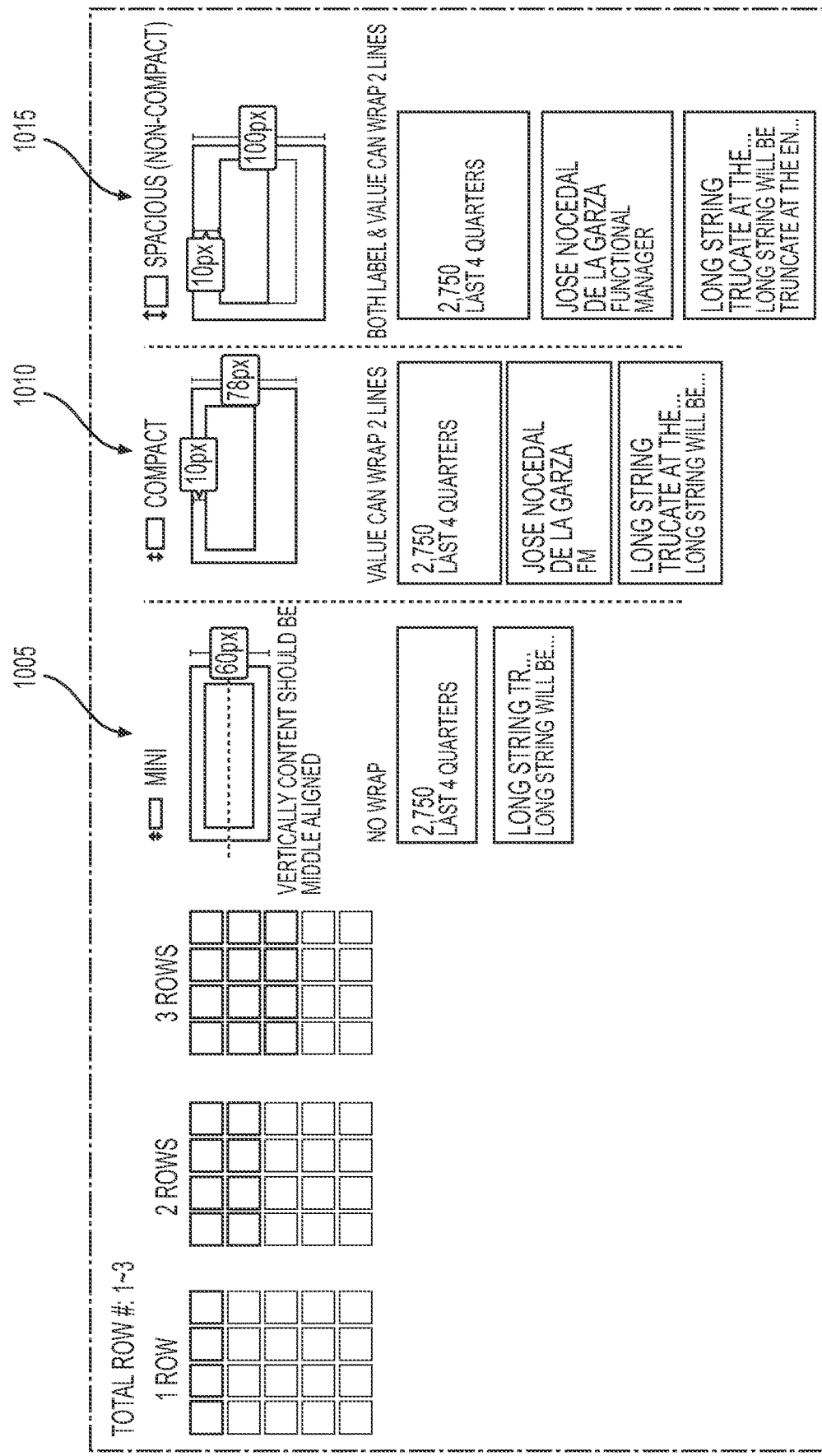

FIG. 10 shows an example matrix design functionality for information cards, according to techniques presented herein. The matrix display may be automatically configured based upon matrix size. For example, smaller matrices may automatically be assigned center-aligned text. Larger numbers of rows or columns in the matrix may trigger automatic left-aligned text. If, in the format panel 240, the user selects a cell height of "mini", shown at 1005, both cell label and value might disallow word wrapping. Instead, ellipses may be displayed when the text of the label and/or value go beyond the width of the cell. If the user selects a cell height of "compact", shown at 1010, the label or value may be allowed to wrap to the subsequent line for a predetermined number of lines before an ellipse is used. If the user selects a cell height of "spacious," shown at 1015, the value and the label may be allowed to wrap to the subsequent line for a predetermined number of lines before an ellipse is used. The number of predetermined height divisions may vary in different embodiments.

Figure 11:
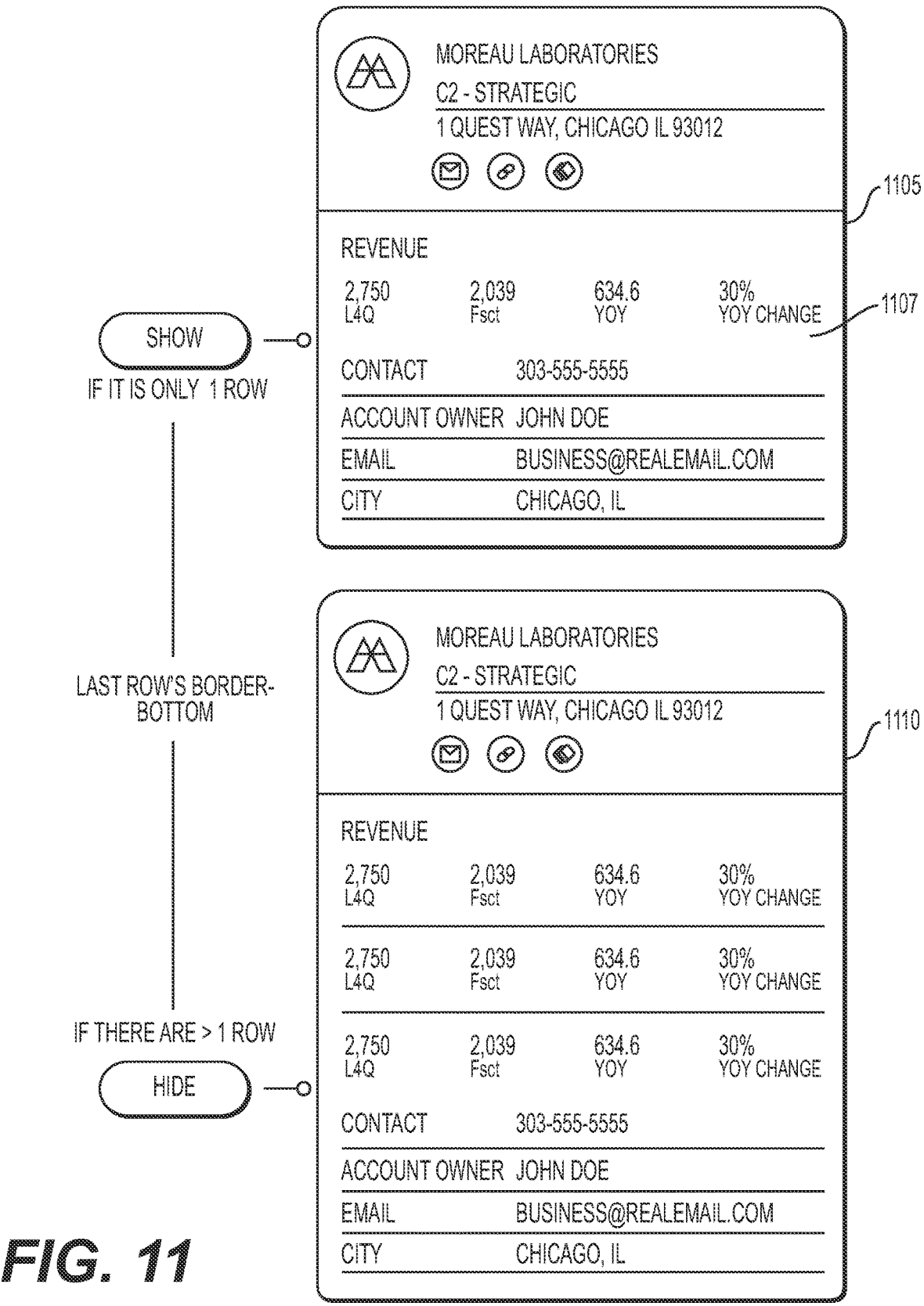
FIG. 11 shows example design features of information cards, according to techniques presented herein.

FIG. 11 shows example design features of information cards, according to techniques presented herein. If there is only one row in the matrix in information card 1105, a bottom border 1107 may be displayed on the bottom of the matrix widget. If there is more than one matrix row, the bottom border may be hidden, as shown in information card 1110.

Additionally, matrices of predetermined sizes may cause a footer 225 to automatically be generated for the information card. For example, matrices with larger than a predetermined number of rows may automatically cause a footer 225 to be added to the associated information card.

Figure 12:
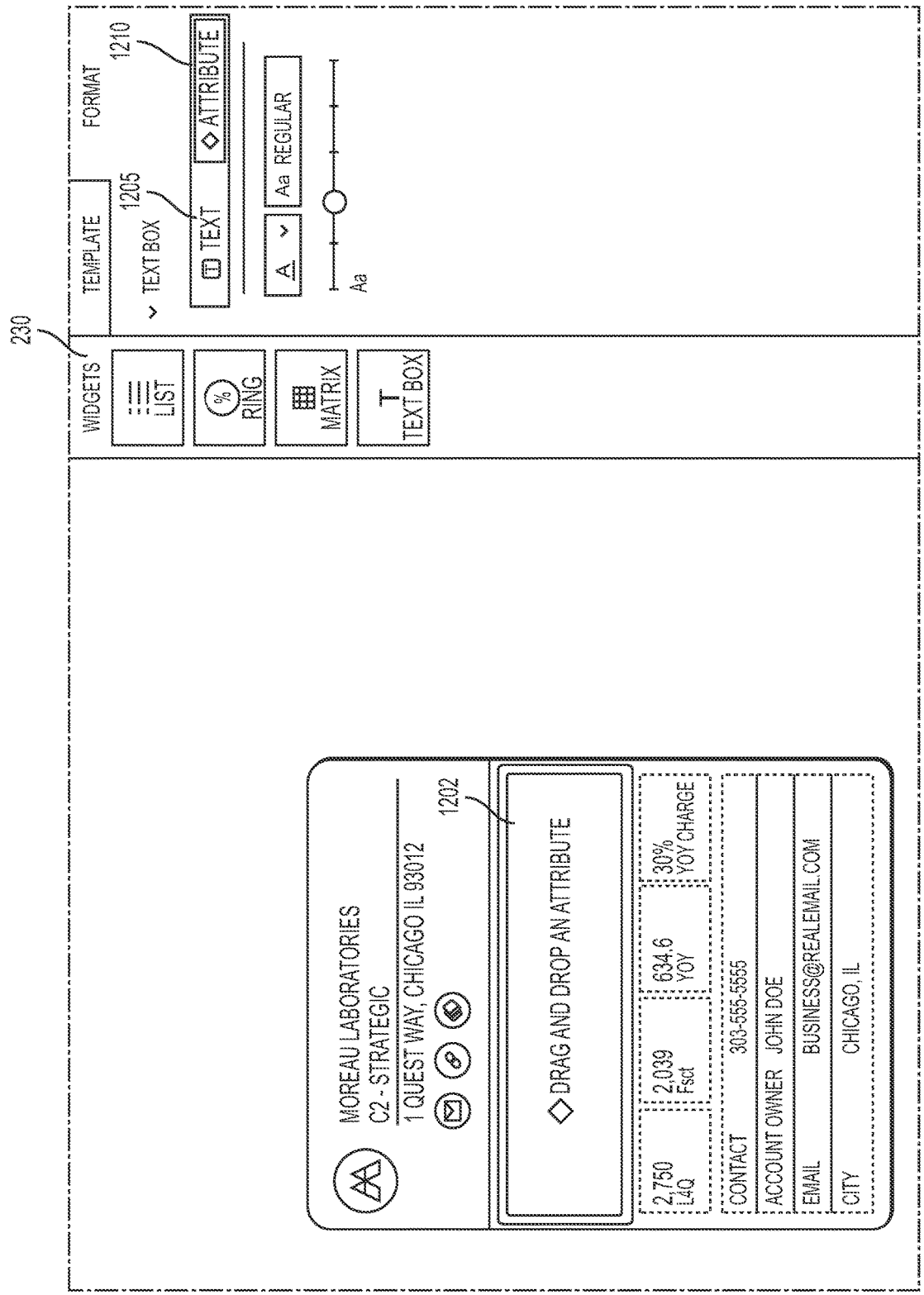
FIG. 12 shows example text widget design features, according to techniques presented herein.

FIG. 12 shows example text widget design features, according to techniques presented herein. Two types of text widgets may be possible, the text box and the attribute box. The text box may allow a user of the editor 200 to type in static text, while the attribute text box may allow a user to compose a dynamic text box by dragging in one or more data sources. After dragging the text widget 1202 from the widget menu 230, the user may select whether the text widget is a text box 1205 or attribute box 1210. If the user selects an attribute box 1210, objects may be dropped from the dataset panel 205. Dropped data objects may then render corresponding values based on keywords in the header. The editor 200 may prohibit both static text and dynamic text being in the same text widget 1202. The text widget 1202 may further have a default height and default size of a bottom margin. When placing the text widget 1202, a placeholder may be shown when dragging, as discussed above. The size of the placeholder may be equal to the default height of the text. The typing cursor may not appear while in production mode.

The user of the editor 200 may decide to switch from text mode to attribute mode, or vice versa. For example, when switching from text mode to attribute mode, if the text box is blank, the switch may be accomplished without any alert. On the format panel, the font size and weight may remain the same after the switch. If the text box is not blank when switching to attribute mode, the content from the text box may be removed, the text box may be resized to the default, and/or an alert may be displayed to the user to warn that the text is about to be deleted. After the first switch, the alert may not display anymore.

If the user of the editor 200 tries to drop a dynamic object from the dataset panel 205 into a static text box, an invalid message may be displayed. Alternatively, the static text box may be converted to an attribute text box. However, if the static text box is not empty, when the user drags an object, for example from the dataset panel 205, onto the static text box, an indicator may be displayed that such an action is not allowed, the text box content may be grayed out, and/or a tooltip may display an error message to the user.

Figure 13:
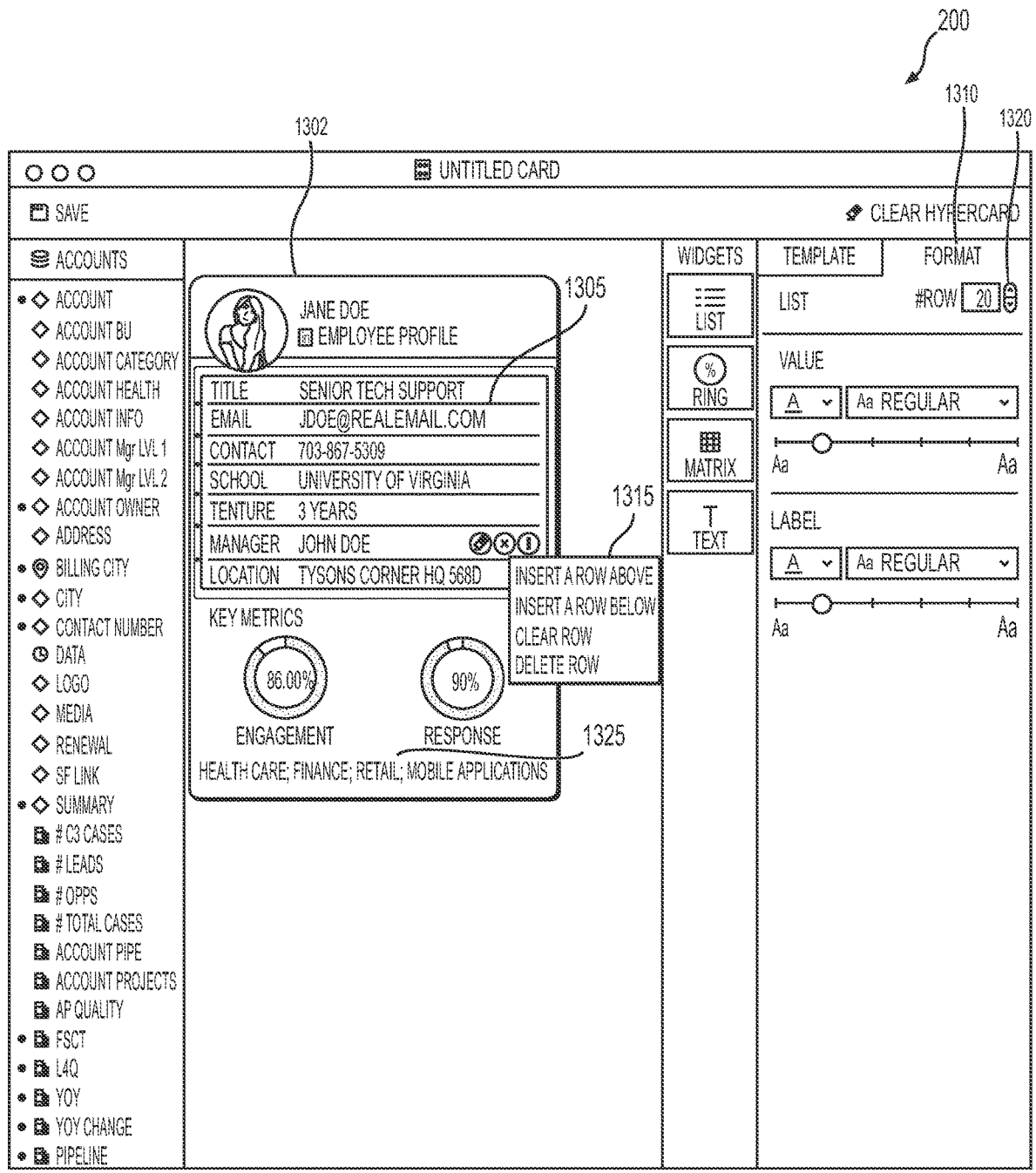

FIG. 13 displays an information card 1302 displaying an example list widget and an example ring widget in the editor 200, in accordance with techniques presented herein. List widget 1305 may be added and formatted in the format panel 1310, or menu 1315. The user may be able to define the number of columns in the list 1305, and may be able to rename rows and columns. The user may be able to add or delete rows from the list 1305 using the format panel 1310, and may be able to resize the size of each column (the relative space for the label and value columns).

If the user manually enters a number, for example a number of columns, in the format panel 1310, it may be determined whether the number is outside of a predetermined acceptable range. If the entered number is above the maximum allowed value, the number may be automatically changed to the maximum allowed value. If the entered number is below the minimum allowed value, the number may be automatically changed to the minimum allowed value. Accordingly, the entered value may automatically be modified by the editor 200 to the nearest number within the predetermined acceptable range.

The user may also be able to use up and down arrow buttons 1320 to modify field values, such as the number of rows in the list widget 1305. When the user reaches the maximum allowable value, the "up" arrow may be disabled. When the user reaches the minimum allowable value, the "down" arrow may be disabled. Further, when the user deletes rows, when there is only one row left, the row deletion functionality may be disabled. If the user enters an invalid number in the format panel 1310, the number may automatically revert to the most recent valid number.

The user may also be able to add a ring widget to the information card in the editor 200. The ring widget may display graphs related to key metrics received from data in the dataset panel 205. The editor 200 may require that two rings be displayed at once, and may accordingly require that the user indicate two data sources.

FIG. 14 shows example design features of a text box widget, according to techniques presented herein. The text box widget may dynamically expand in size based on the size of the largest text within the text box. Predetermined cell padding may further be added, so that the text box always fits the content. The text box may automatically increase in size when the user modifies the font size. The text box may automatically increase in size when the text extends to multiple lines.

Figure 15:
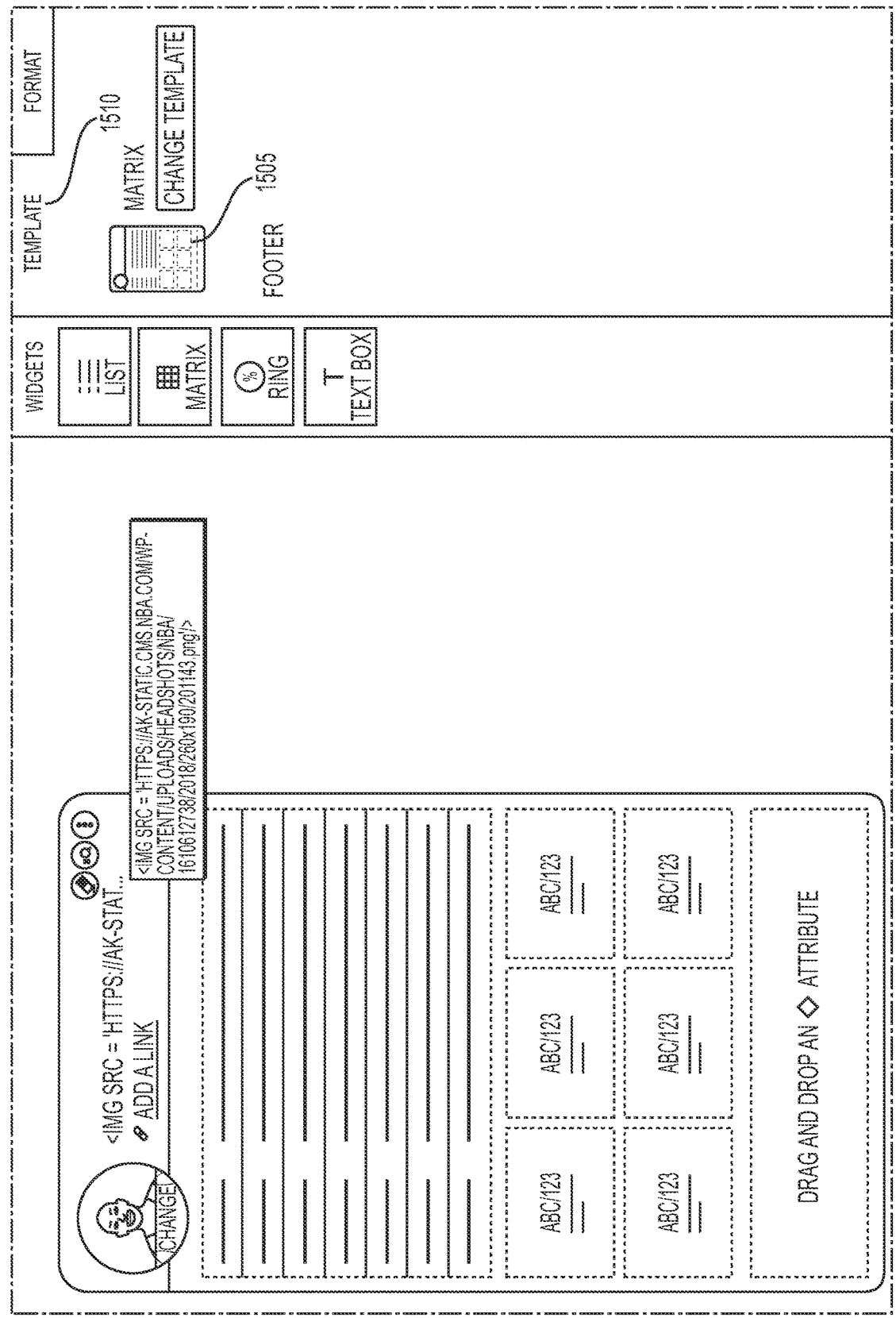
FIG. 15 shows an example design functionality using templates, according to techniques presented herein.

FIG. 15 shows an example design functionality using templates, according to techniques presented herein. The user may select one or more templates 1505 from template panel 1510. Sets of templates may be made available, for example, the user may be able to initially select to see a plurality of templates containing a matrix, and may choose from among them.

Figure 16:
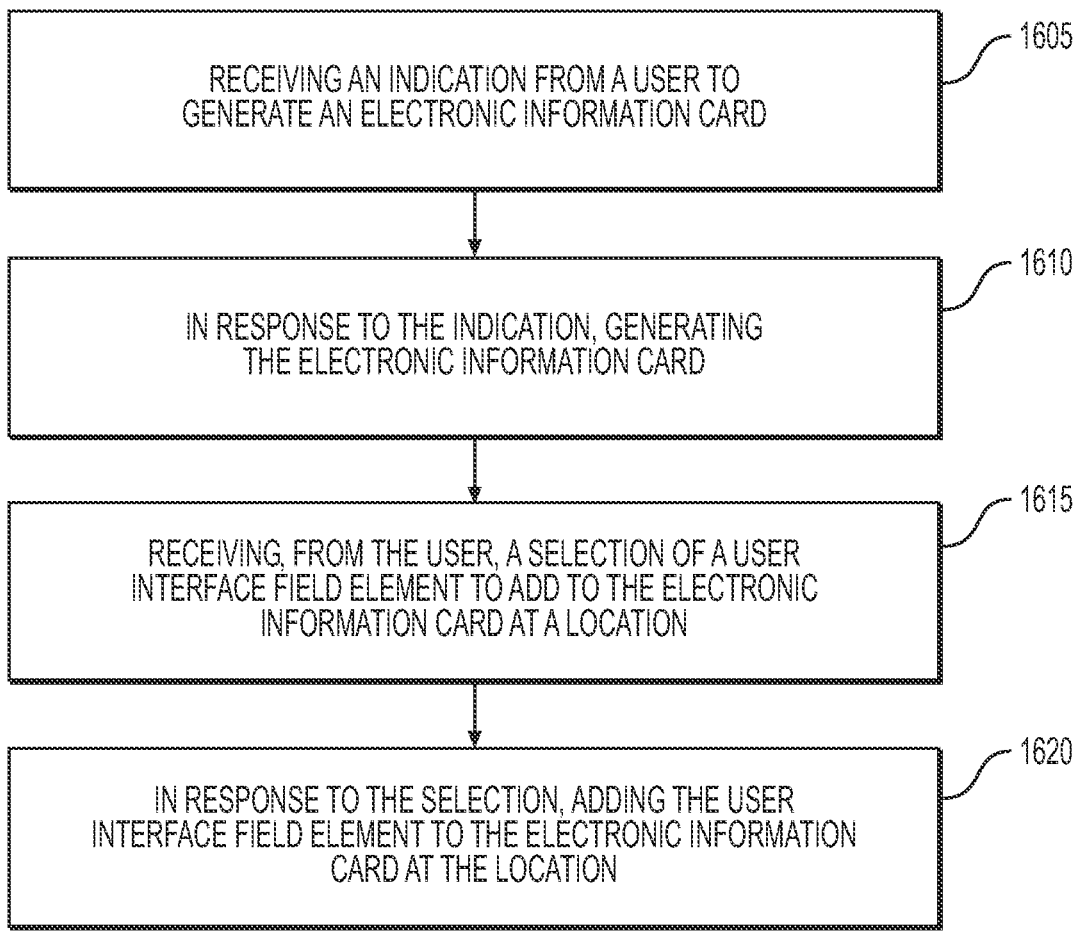
FIG. 16 is a flow chart of an example method of displaying contextually relevant information, according to techniques presented herein.

FIG. 16 is a flow chart of an example method of displaying contextually relevant information according to techniques presented herein. At step 1605, an indication may be received from a user to generate an electronic information card. At step 1610, in response to the indication, the electronic information card may be generated. At step 1615, a selection of a user interface field element may be received from the user to add to the electronic information card at a location. At step 1620, in response to the selection, the user interface field element may be added to the electronic information card at the location.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method for generating contextually relevant electronic information cards, comprising:
   receiving an indication from a user to generate an electronic information card, the electronic information card being displayable proximate to one or more keywords on an electronic display;
   determining a type of information card from a plurality of types of information cards based on an organization associated with the user;
   in response to the indication, generating the electronic information card that corresponds to the determined type of information card, the electronic information card comprising widget locations and non-widget locations;
   providing a widget panel comprising a plurality of widgets selectable by the user;
   receiving, from the user, a selection of a first widget to add to the electronic information card at a first user selected location;
   determining that the first user selected location corresponds to a widget location;
   providing the first widget at the first user selected location on the electronic information card;
   receiving, from the user, a selection of a second widget to add to the electronic information card at a second user selected location;
   determining that the second user selected location corresponds to a non-widget location; and
   rejecting the second widget based on the second user selected location corresponding to the non-widget location.

2. The method of claim 1, further comprising determining the type of information card from the plurality of types of information cards further based on a user status, wherein the user status comprises a user authorization level further comprising: generating the electronic information card based on the user authorization level.

3. The method of claim 2, wherein the electronic information card comprises content that is selected based on the user authorization level.

4. The method of claim 3, wherein the content is further selected based on at least one of a user role or an interaction history.

5. The method of claim 1, further comprising determining the type of information card from the plurality of types of information cards further based on a user status, wherein the user status or the organization associated with the user is determined upon user authentication.

6. The method of claim 1, further comprising:
   accessing a private database associated with the organization associated with the user; and
   identifying the one or more keywords from the private database, the one or more keywords having a semantic meaning specific to the organization.

7. The method of claim 1, wherein the electronic information card is displayed within an application that comprises the one or more keywords.

8. The method of claim 1, wherein the selection of a first widget comprises dragging the first widget from the widget panel into the electronic information card.

9. The method of claim 8, wherein the first widget is of a first widget type and further comprising displaying a placeholder of a predetermined size of the first widget type within a body of the electronic information card while dragging the first widget into the information card.

10. The method of claim 1, further comprising moving the first widget to a second location within the electronic information card.

11. The method of claim 1, further comprising:
   providing a template panel comprising a plurality of templates, each template comprising at least a subset of the plurality of widgets selectable by the user, wherein receiving the selection of the first widget to add to the electronic information card at a user selected location comprises receiving, from the user, a selection of a template comprising at least a subset of the plurality of widgets including the first widget.

12. A system for generating contextually relevant electronic information cards comprising:
   one or more processors; and
   one or more machine-readable media storing software including instructions that, when executed by the one or more processors, cause the system to perform operations comprising:
   receiving an indication from a user to generate an electronic information card, the electronic information card being displayable proximate to one or more keywords on an electronic display;
   determining a type of information card from a plurality of types of information cards based on an organization associated with the user;
   in response to the indication, generating the electronic information card that corresponds to the determined type of information card, the electronic information card comprising widget locations and non-widget locations;
   providing a widget panel comprising a plurality of widgets selectable by the user;
   receiving, from the user, a selection of a first widget to add to the electronic information card at a first user selected location;
   determining that the first user selected location corresponds to a widget location;
   providing the first widget at the first user selected location on the electronic information card;
   receiving, from the user, a selection of a second widget to add to the electronic information card at a second user selected location;
   determining that the second user selected location corresponds to a non-widget location; and
   rejecting the second widget based on the second user selected location corresponding to the non-widget location.

13. The system of claim 12, wherein the operations further comprise determining the type of information card from the plurality of types of information cards further based on a user status, wherein the user status comprises a user authorization level further comprising: generating the electronic information card based on the user authorization level.

14. The system of claim 13, wherein the electronic information card comprises content that is selected based on the user authorization level.

15. The system of claim 12, wherein the operations further comprise determining the type of information card from the plurality of types of information cards further based on a user status, wherein the user status or the organization associated with the user is determined upon user authentication.

16. The system of claim 12, the operations further comprising:
  accessing a private database associated with the organization associated with the user; and
  identifying the one or more keywords from the private database, the one or more keywords having a semantic meaning specific to the organization.

17. The system of claim 12, wherein the electronic information card is displayed within an application that comprises the one or more keywords.

18. The system of claim 12, the operations further comprising:
  providing a template panel comprising a plurality of templates, each template comprising at least a subset of the plurality of widgets selectable by the user, wherein receiving the selection of the first widget to add to the electronic information card at a user selected location comprises receiving, from the user, a selection of a template comprising at least a subset of the plurality of widgets including the first widget.

19. One or more non-transitory machine-readable media storing instructions that, when executed by one or more processors, cause performance of operations for generating contextually relevant electronic information cards, the operations comprising:
  receiving an indication from a user to generate an electronic information card, the electronic information card being displayable proximate to one or more keywords on an electronic display;
  determining a type of information card from a plurality of types of information cards based on an organization associated with the user;
  in response to the indication, generating the electronic information card that corresponds to the determined type of information card, the electronic information card comprising widget locations and non-widget locations;
  providing a widget panel comprising a plurality of widgets selectable by the user;
  receiving, from the user, a selection of a first widget to add to the electronic information card at a first user selected location;
  determining that the first user selected location corresponds to a widget location;
  providing the first widget at the first user selected location on the electronic information card;
  receiving, from the user, a selection of a second widget to add to the electronic information card at a second user selected location;
  determining that the second user selected location corresponds to a non-widget location; and
  rejecting the second widget based on the second user selected location corresponding to the non-widget location.

20. The non-transitory machine-readable media of claim 19, further comprising:
  accessing a private database associated with the organization associated with the user; and
  identifying the one or more keywords from the private database, the one or more keywords having a semantic meaning specific to the organization.

\* \* \* \* \*